(12) United States Patent
Godin et al.

(10) Patent No.: US 6,266,652 B1
(45) Date of Patent: *Jul. 24, 2001

(54) COMPUTER AUCTION SYSTEM

(75) Inventors: Paul B. Godin, Kenleby; Jeffrey Lymburner, Etobicoke, both of (CA)

(73) Assignee: Bid.Com International Inc. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/264,865

(22) Filed: Mar. 9, 1999

Related U.S. Application Data

(62) Division of application No. 08/703,036, filed on Aug. 26, 1996, now Pat. No. 5,890,138.

(51) Int. Cl.[7] .............................. G06F 17/60; G06F 17/00
(52) U.S. Cl. ................................ 705/37; 705/26; 705/27
(58) Field of Search .................................. 705/14, 26, 27, 705/37

(56) References Cited

U.S. PATENT DOCUMENTS

| | | | |
|---|---|---|---|
| 3,581,072 | * | 5/1971 | Nymeyer ................................. 705/37 |
| 4,789,928 | * | 12/1988 | Fujisaki ................................. 705/37 |
| 5,553,145 | * | 9/1996 | Micali ................................. 705/37 |
| 5,629,982 | * | 5/1997 | Micali ................................. 705/37 |
| 5,640,569 | * | 6/1997 | Miller et al. ........................ 705/37 |
| 5,794,219 | * | 8/1998 | Brown ................................. 705/37 |
| 5,835,896 | * | 10/1998 | Fisher et al. ........................ 705/37 |
| 5,905,975 | * | 5/1999 | Ausubel .............................. 705/37 |
| 6,023,685 | * | 2/2000 | Brett et al. .......................... 705/37 |

FOREIGN PATENT DOCUMENTS

WO 9634356 * 10/1996 (WO) ............................. G06F/17/60

OTHER PUBLICATIONS

Rockoff, T.E., Groves, M.; "Design of an Internet-based System for Remore Dutch Auctions", Internet Research, v 5, n 4, pp. 10–16, MCB University Press, Jan. 1995.*

Individual Inc., Industrial Announces Revolutionary "Dutch Auction" System for Ads on NewsPage Web Service, 1998 Business Wire.

* cited by examiner

Primary Examiner—James P. Trammell
Assistant Examiner—James W. Myhre
(74) Attorney, Agent, or Firm—Katten Muchin Zavis

(57) ABSTRACT

An auction system is disclosed which allows users to participate using their own computers suitably connected to the auction system. Preferably, this connection uses INTERNET. The invention involves a method and system for providing rapid feedback of a reverse auction process and removes the user from the process once an indication to purchase has been received. Rapid feedback in combination with security of information is achieved with the method and auction system.

28 Claims, 12 Drawing Sheets

DATABASE FIELDS

UPC CODE
PRODUCT DESCRIPTION
AUCTION DATE AND TIME
CURRENT QUANTITY
STARTING PRICE
CLOSING PRICE
LARGE PRODUCT IMAGE
SMALL PRODUCT IMAGE
PRODUCT CARRY
WARRANTY COST
MIN. COST
WARRANTY AVAILABLE
AUCTION END TIME
PRODUCT GATALOG
PRODUCT WEIGHT
PRODUCT DESCRIPTION EXTENDED
PRODUCT STREET PRICE
PRODUCT VENDOR
AUCTION PRODUCT NUMBER

Bill of Sale

This page has a life span of 2 minutes. You must complete this form within this time or you will lose your locked in price!

| Fisher Price Porsche 911 Turbo | Unit Cost | $228.00 | ← 164 |
|---|---|---|---|
| • This is the toy that every child would love | Freight | $50.00 | ← 166 |
| • Give them the opportunity to drive like yourself | PST | $22.24 | ← 168 |
| • Very safe and battery operated | GST | $19.46 | ← 170 |
| Total Purchase Cost | - | $319.70 | ← 172 |

Credit Card

Account No:   Expiry Date: ← 178

Card Type:   MasterCard Visa ← 180

[Proceed]   [Cancel] ← 176

174

Shipping time 14-21 days

INTERNET LIQUIDATORS

[HOME]
[HOW IT WORKS]
[EXT. WARRANTY]
[THE MALL]

NEXT ON THE BLOCK

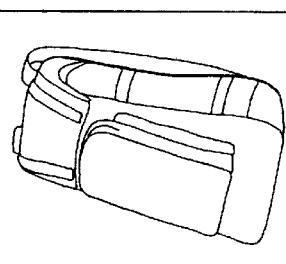

COMPUTER AUCTION SYSTEM

This is a divisional application of U.S. application Ser. No. 08/703,036, filed Aug. 26, 1996 U.S. Pat. No. 5,890,138.

FIELD OF THE INVENTION

The present invention relates to a computerized auction system and a method for carrying out an auction system where users access the auction system by remote terminals.

BACKGROUND OF THE INVENTION

Auctions for sale of products have proven to be very popular and the success of the systems involve two major features. Typically with auction systems, there is the possibility to obtain the product at a very competitive price. In addition, there is the excitement and skill of the buyer who participates in the auction process and makes fast decisions whether to continue to participate or to recognize the price has become too high. The auction process, traditionally, has been a relatively fast process which changes quickly. The standard auction process involves users bidding for a particular product, and the product is sold to the highest bidder.

The dynamic nature of the auction process, in its traditional form, is attractive to a certain number of participants, but it is also an obstacle to a further group of participants who do not wish to rush their decision process. For this reason, there are other variations of the auction process where the time period for the auction is much longer and the feedback of information tends to be slower. Some auction processes do not provide any real time feedback, such as a silent auction process, where users merely submit their bid, which is confidential.

A further variation of the auction process is a reverse auction where the price of the product decreases in a set manner during the time period of the auction and each participant is provided with the current price, the quantity on hand and the time remaining in the auction. This type of auction, typically, takes place over a very short period of time and there is a flurry of activity in the last portion of the auction process. The actual auction terminates when there is no more product to be sold or the time period expires. A reverse auction process has been used very effectively in Holland for the sale of flowers to wholesalers.

The auction process for the sale of products has also been used on INTERNET. In this case, the various users send E-mail to the auction site with details of their bid and identity. Details of the bid are posted on the auction site computer and are available to other participants. The auction process typically has a time period of several days or weeks, and the product is allocated to the highest bidders. This type of process does not provide the excitement or the real time dynamic feedback of a traditional auction or a reverse auction. One of the advantages of this system is the lack of complexity in running of the auction process over INTERNET where E-mail is used to communicate with the auction computer.

SUMMARY OF THE INVENTION

The present invention is directed to a method of auctioning products on-line where participants use computer terminals to access a computer site and participate. The method comprises maintaining a computer database of product information, identifying different products to be auctioned, assigning to each product a designated time for the product to be auctioned, promoting the product and the designated time of the auction prior to the auction to increase awareness of the product, carrying out an auction at the designated time by setting a fixed time period for completing the auction, displaying a current price for the product and decreasing the price of the product as the time remaining in the auction decreases, displaying the quantity of the product remaining to be auctioned and decreasing the quantity to reflect, during-the auction process, instructions from purchasers of their desire to purchase the product as the instructions are received thereby providing dynamic feedback to potential purchasers during the auction, providing each potential purchaser with a designated actuation control for instructing the computer site of the decision to purchase the product at the current price at the time of receiving the instructions and registering potential purchasers and obtaining and recording financial data for automated payment of a purchased product.

According to an aspect of the invention, the method includes removing each purchaser from the auction process upon providing instructions to purchase the product at the displayed current price at the time the instructions were received. In this way the purchaser is not exposed to further decreases in the price of the product, and is removed from that particular auction process.

According to a further aspect of the invention, the method includes registration of the purchaser or potential purchasers which can take place as part of a pre-registration process. The registration process can occur on-line or can be carried out off-line.

According to a further aspect of the invention, the method includes connecting the computer site directly to separate and distinct financial institutes for real time confirmation of acceptable financial transaction of the purchase price of a product. In this way, automated payment confirmation is carried out.

A computer site for auctioning a product on-line according to the present invention comprises at least one web server computer designed for serving a host of computer browsers and providing said browsers with the capability to participate in various auctions, where each auction is of a single product, at a specified time, with a specified number of the product available for sale. The web server cooperates with a separate database computer, separated from the web server computer by a firewall. The database computer is accessible to the web computer server computer to allow selective retrieval of product information which includes:

a) a product description;
b) the quantity of the product to be auctioned;
c) a start price of the product; and
d) at least one product image.

The web server computer includes custom written application software for auctioning any product identified in the database computer by displaying, during an auction, the current price of the product, the quantity of the product remaining available for purchase and the measure of the time remaining in the auction, decreasing the current price during the auction, providing a user actuation control for indicating instructions to purchase the product at a displayed current price, continually updating the current price, the quantity of the product remaining available for purchase, taking into account the product indicated as purchased and the time remaining in the auction to provide dynamic feedback to each user and removing the user from the auction upon receiving an instruction signal from the user and thereafter obtaining identification and required financial authorization for the purchase of the product.

BRIEF DESCRIPTION OF THE DRAWINGS

Preferred embodiments of the invention are shown in the drawings, wherein:

FIG. 4 shows various data fields retained in the database server.

FIGS. 5 to 12 are prints of various screens that the computer system provides to the user during browsing at the site and during the auction process.

DETAILED DESCRIPTION OF THE PREFERRED EMBODIMENTS

Figure 1:
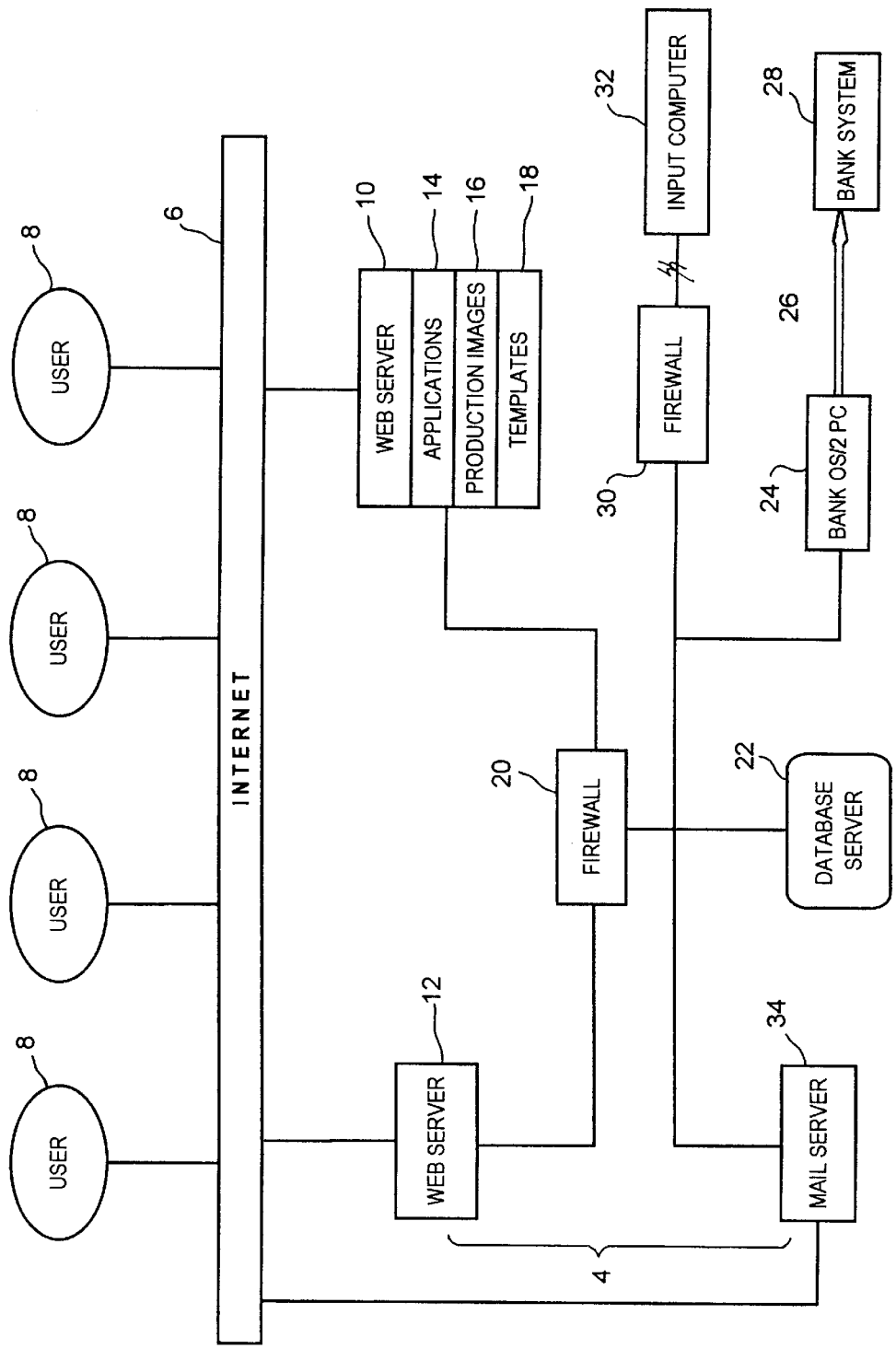
FIG. 1 is an overview of the auction system.

FIG. 1 is an overview of the auction system 2. With this system a host of users shown as 8, access the web site 4 using INTERNET 6. Each of the users 8 has a computer terminal with the appropriate software for accessing INTERNET. The users 8 are unknown to the web server computers 10 and 12 and allow each user 8 to browse the web site and explore how the auction system functions.

There are several aspects which have to be addressed to maintain security of information maintained in the database server 22 as well as the banking system shown as 28. A firewall 20 prevents any user 8 from accessing any of the components behind the firewall 20. In this way the users have access to the web server computers 10 and 12, but only have access to the database server through the firewall 20. The database server maintains, amongst other things, various database fields with respect to each of the products which are slated to be auctioned. As shown in FIG. 4, these data fields include a UPC code, a product description, an auction date and time, a current quantity, a starting price for the auction, a closing price for the auction, a large product image, a small product image, product carry, warranty cost, a minimum cost, a designation whether a warranty is available, an auction end time, a product catalogue, a product weight which is used as part of the shipping costs, an extended product description, a product street price, a product vendor allocation as well as an auction product number. The database maintains each of the products with a time designation associated therewith as this time designation control is used by the system to determine what products can be browsed by the users. Each of the web server computers 10 and 12 do allow users to view product categories and actual products which are slated to be auctioned within a specified time period, typically about one week, to generate interest in particular products. All products that are slated to be auctioned are not listed and browsers are encouraged to return to the web site on an ongoing basis to see what new products are to be auctioned in the near future. It can be appreciated that the time designation control allows this to be easily accomplished.

The web server computers 10 and 12 are identical and can be duplicated as additional load on the system occurs. Basically, the web server computers 10 and 12 share the responsibility for servicing the users of the site. This arrangement provides for immediate expandability of the system by merely adding additional web server computers as necessary.

Preferably, the system includes an appropriate computer terminal designated 24 for interfacing with independent financial institutes which are connected on-line via the serial connection 26 to the financial institute computers designated as 28. This allows automatic real time confirmation of the purchase of auction products as will be more fully explained. Basically, once a user has indicated that he wishes to purchase a product, he is removed from the auction process and goes through an identification or registration process as well as the exchange of financial information to allow for credit or debit card payment of the purchase. This is then confirmed and authorized by the appropriate institute designated in FIG. 1 as the bank system 28. Confirmation of the purchase is made by the mail server 34 which sends E-mail to the user confirming the purchase. It is also used to send updates of upcoming information. The mail server 34 only allows mail to be sent out, and is not capable of receiving mail. In this way, security of the databases are various maintained. The database server 22 is also designed to interact with the input computer designated as 32. A firewall 30 serves to prevent unauthorized access to the database server or to the input computer.

Figure 2:
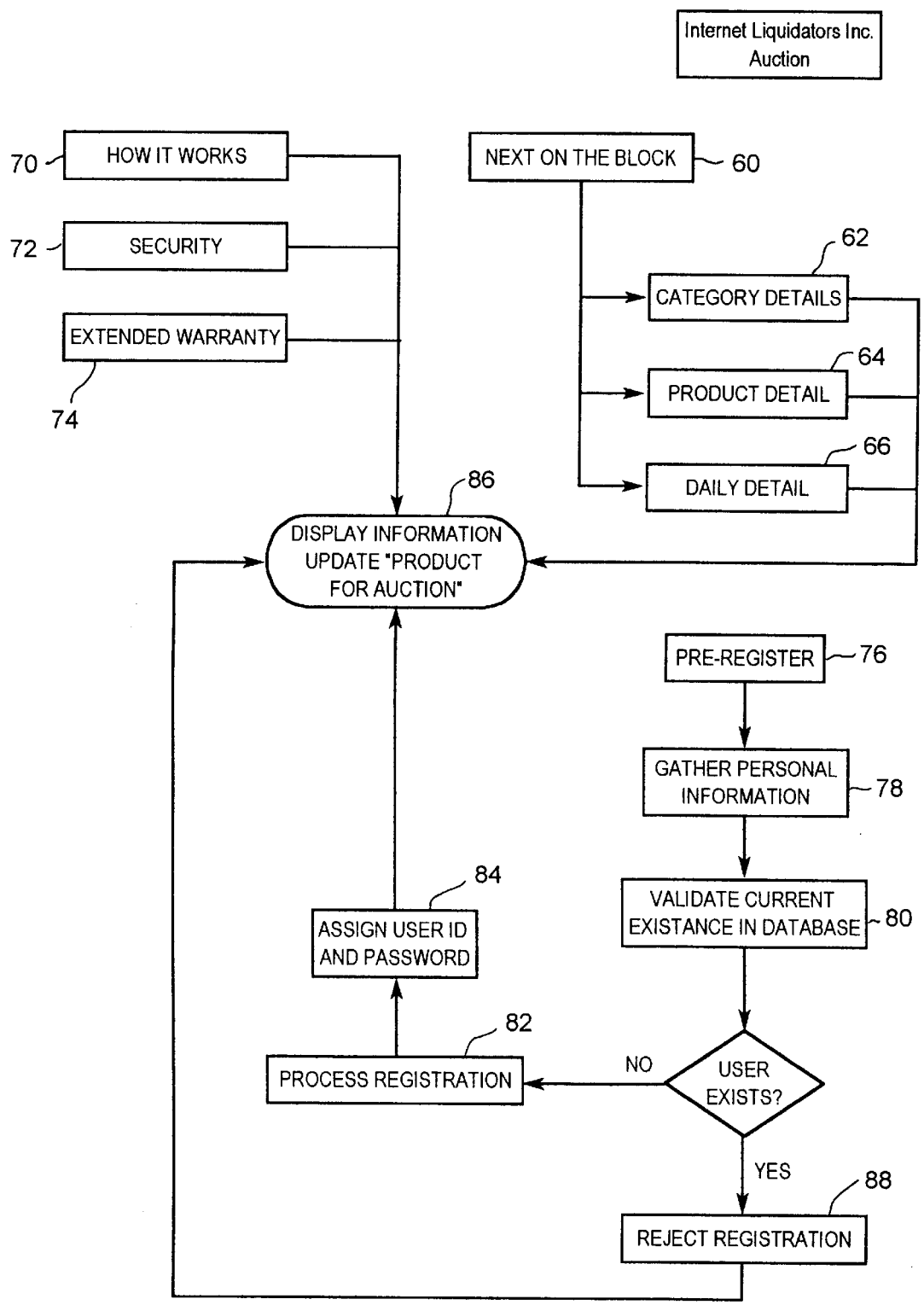
FIG. 2 is an overview showing part of the logic processing for dealing with a user at the web site.
Figure 6:
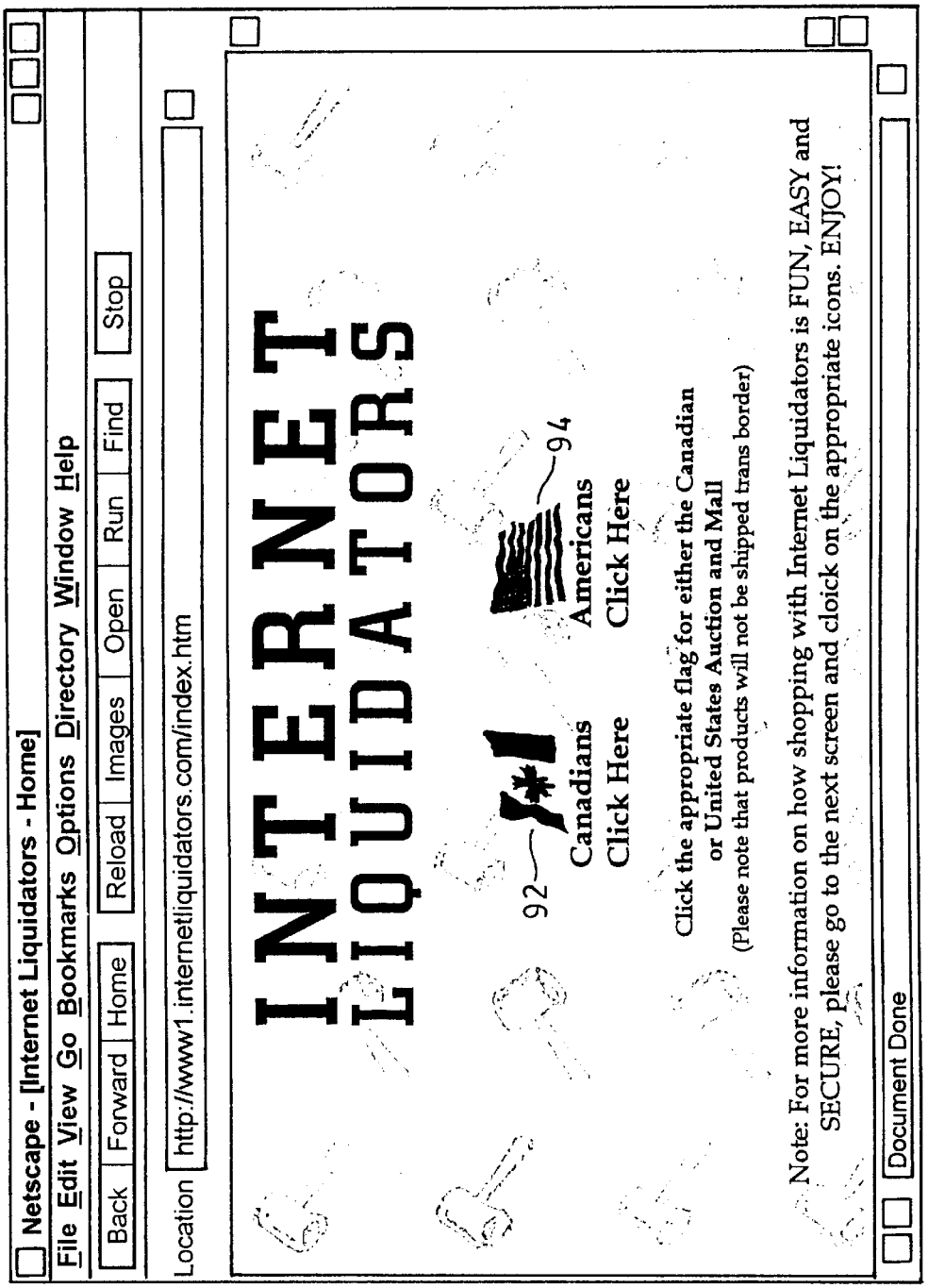
Figure 7:
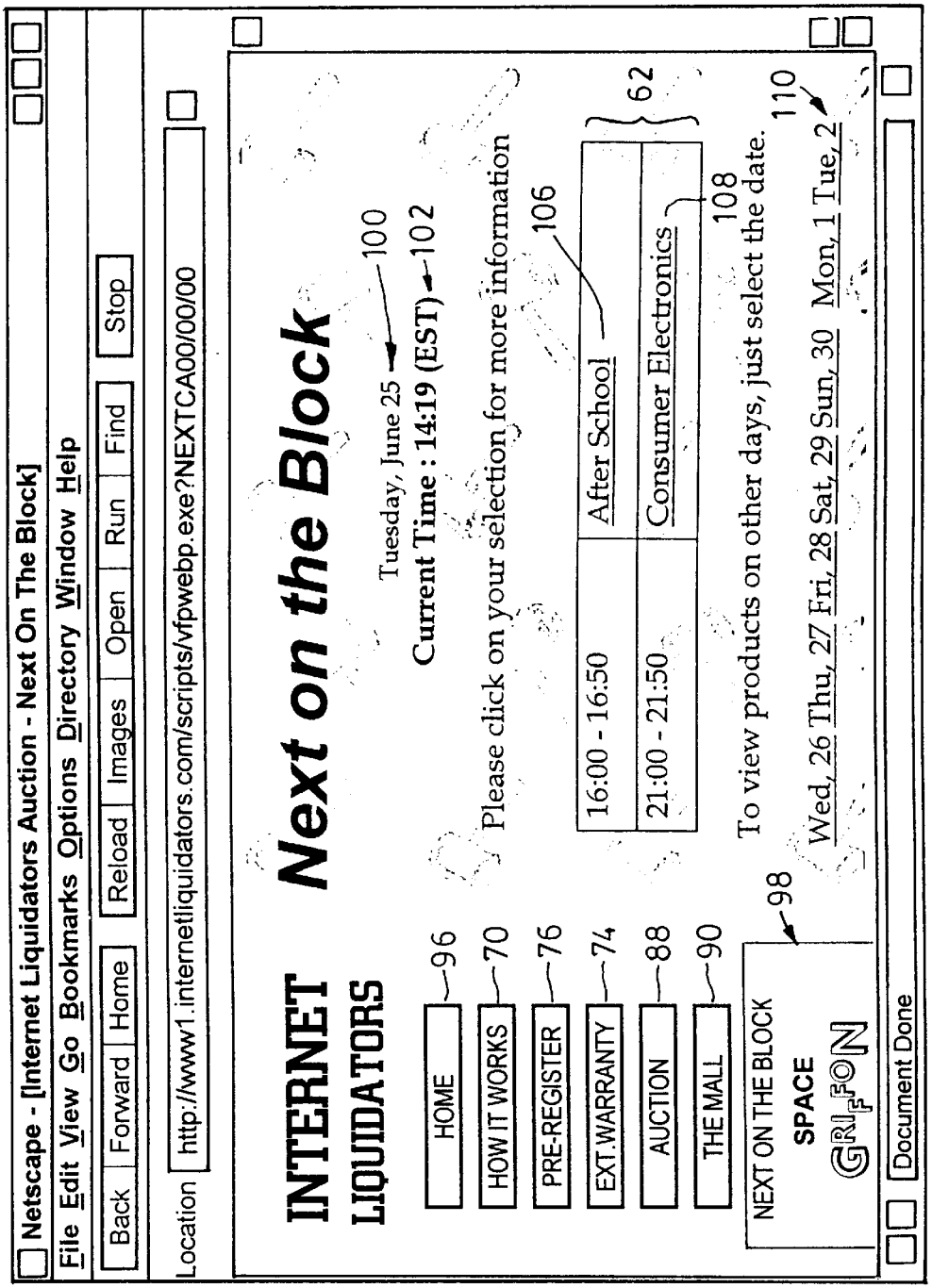

FIG. 2 provides additional insight into how a browser can participate in the auction process. Once a browser has gone through a number of preliminary screens (FIGS. 5 and 6), he is exposed to the logic generally shown in FIG. 2. In this case there is a screen 60 entitled "Next on the Block" (FIG. 7). This screen provides category information generally indicated as 62, in FIG. 2 and FIG. 7, of upcoming auctions and clicking on any of these categories allows the user to review product details generally shown as 64, in FIG. 2 and FIG. 8. In addition, it is possible to get details of auctions at other times generally indicated as box 66. In this way, the user can index through a number of screens to get information regarding upcoming products to be auctioned that may be of interest to him. In addition, he is allowed to click on any of the triggers identified as 70, 72, 74 and 76. These correspond to HOW IT WORKS, SECURITY, EXTENDED WARRANTY and PRE-REGISTRATION. Clicking on trigger 70 provides the user with information on how the auction process works, explains the reverse auction and provides details on how the user can participate in the auction. Clicking on trigger 72 provides details regarding security of the system and automated payment. In some cases, products are offered with extended warranties and clicking on trigger 74 can provide details of the extended warranties and explains that they may only be available on certain products.

Trigger 76 allows a user to pre-register and obtain a user I.D. number. This user I.D. number is combined with certain financial information retained in the database in an encrypted form. The pre-registration trigger 76 illustrates step 78 which is gathering of personal information such as credit card number and expiry date to allow for automated payment. It requires step 80 to validate existence in the database if this in fact occurs, the answer is no, the user is forced into a registration process indicated as 82. A user I.D. is assigned and a password is entered. This information is maintained in the database 22. At step 84 he is then provided a screen identifying his user I.D. at 86.

If the user already exists, the registration process is rejected at 88 and the user is advised of his information at display 86.

Figure 5:
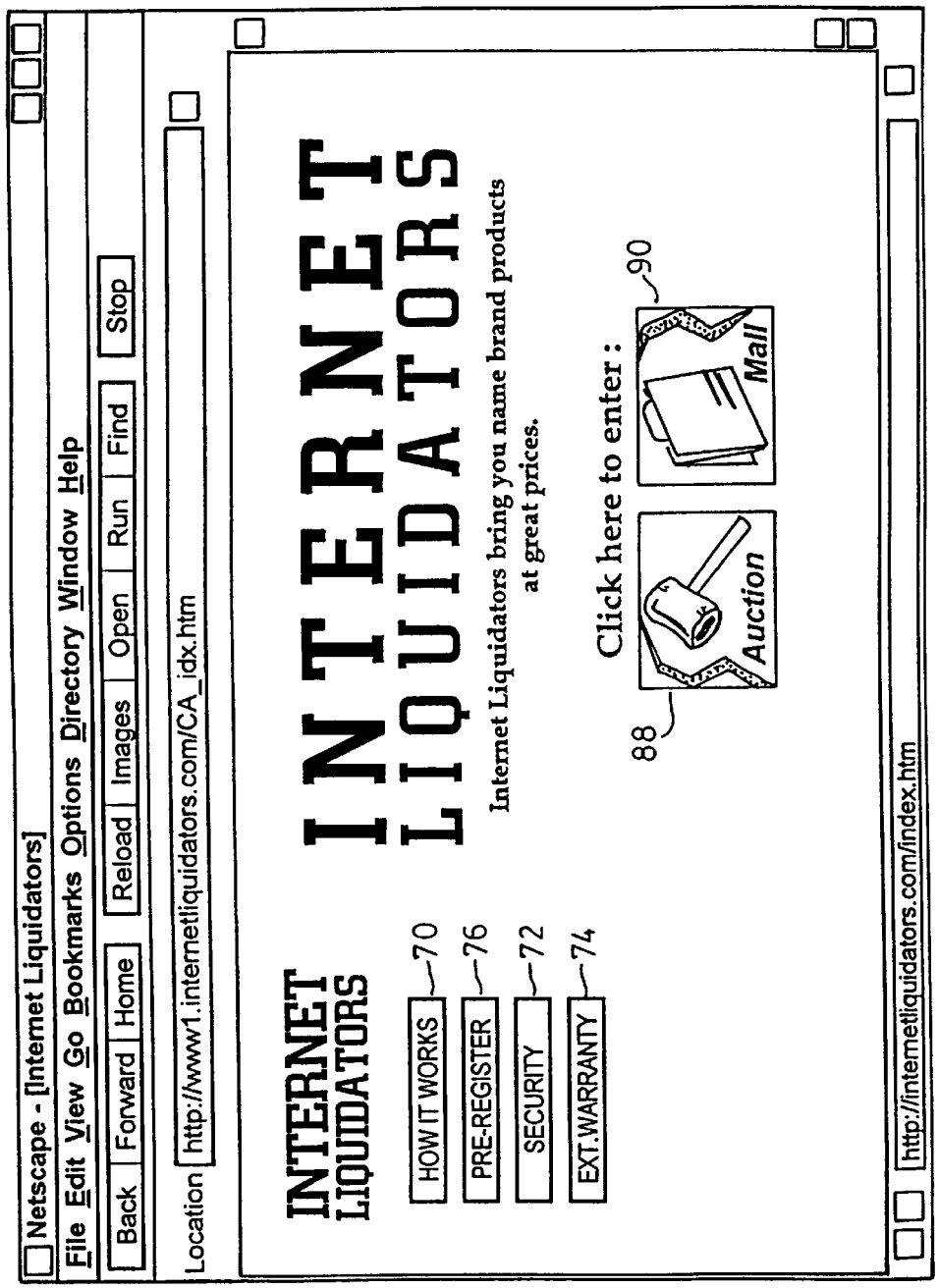

FIG. 5 shows the opening screen presented to a browser when they visit the web site 4. In this case there are basically six triggers that the browser can actuate. There are triggers 70, 72, 74 and 76 as previously discussed, as well as the auction trigger 88 and the mall trigger 90. The mall is basically a normal sale-type approach whereas actuation of the auction trigger 88 takes the user to the screen shown in FIG. 6. The screen shown in FIG. 6 has triggers 92 and 94.

These are basically country designations and therefore provides information relevant to each of the two countries. It is apparent that this system is a worldwide system, however, not all users will be able to purchase products in all auctions. At least initially, it is desirable to limit the auctions to users where the sale is relatively straightforward, and avoid problems such as duties, custom clearing and other issues associated with crossing of national boarders. Therefore the screen shown in FIG. 6 allows the user to at least indicate what country he is interested in reviewing auctions for. The ability to view these auctions does not necessarily allow the user to purchase products offered in the auctions.

The screen shown in FIG. 7 is referred to as next on the block. On the left-hand side of the screen, various triggers are provided indicated as triggers 70, 74, 76, 88, 90 and 96, which is the home trigger. These are fixed Additionally, there is a small advertisement showing the product next to be auctioned at 98. This is the small product image and is basically an advertisement.

Figure 8:
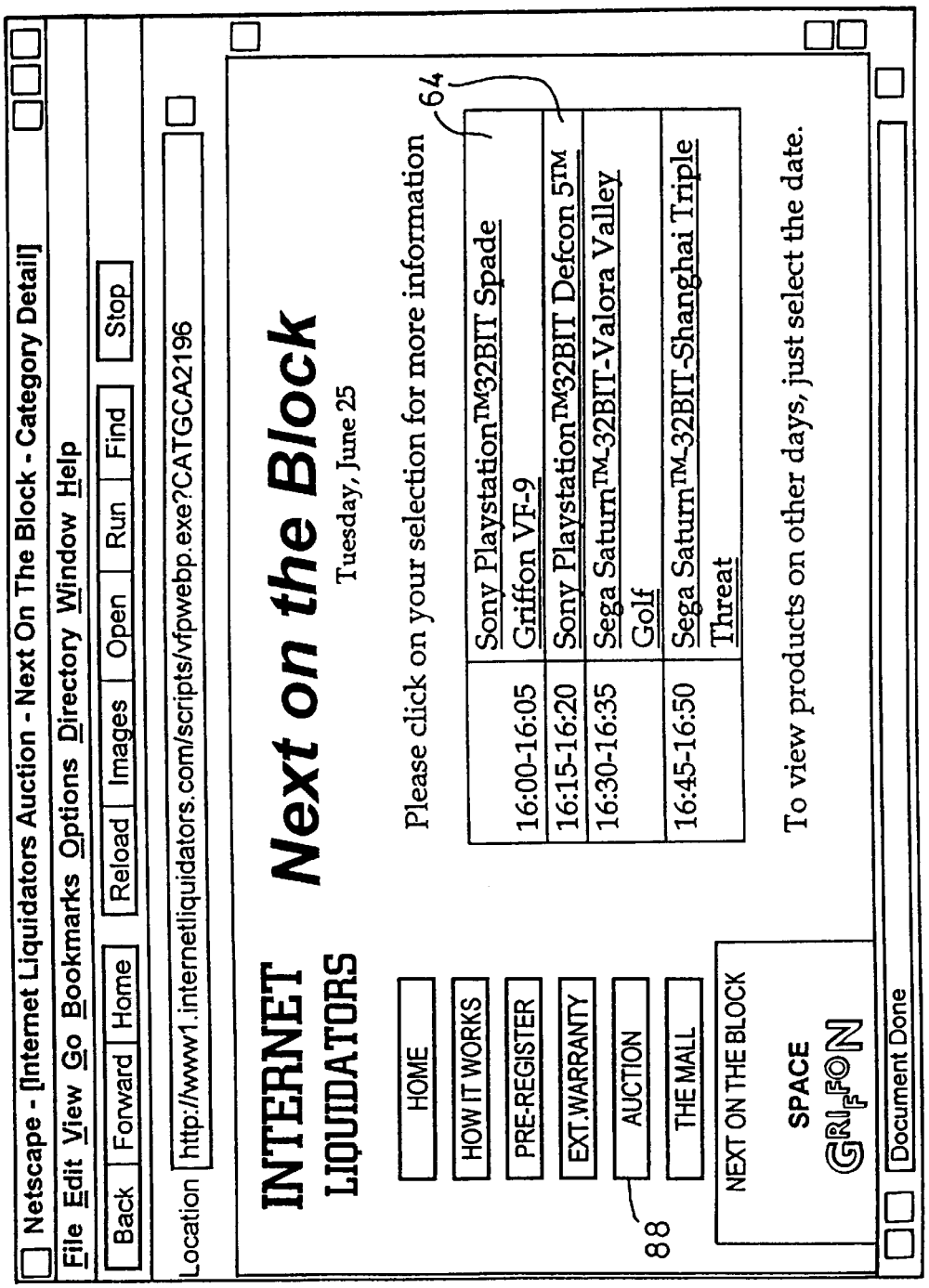

On the right-hand side of the screen, category designations of up-coming auctions are shown. Initially, the user is taken to the current date, indicated at 100, provided with the current time, indicated as 102, and is provided with auction time and category information at 104. The first category "After School" is shown at 106 and a second category "Consumer Electronics" is shown at 108. In each case there is a specified time period showing when auctions will occur. There are also other dates provided at 110 which the user can explore for different product categories. Clicking on any of the dates shown at 110 will provide a screen similar to FIG. 7 but with the various times and product categories shown at 104 for that particular date. Clicking on one of the categories 64 will provide additional information. This additional information is shown in FIG. 8 for the category "After School". In this case, four different options are shown starting at the time period 16:00. It can be seen that each of the auctions are of a duration of five minutes and the particular product to be auctioned is listed with a brief product description. Clicking on any of these additional brief product descriptions will access a further, more complete product description, a larger product image and a suggested street price of the product. This screen is shown in FIG. 9 for a coffeemaker displayed on the right-hand side of the screen.

Figure 9:
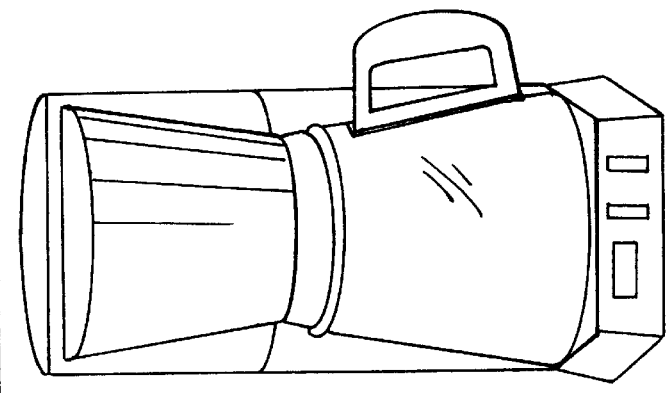

The various screen shown in FIGS. 5 through 9 involve the use of various applications which are maintained on the web server computers 10 and 12. The user's requests determine what applications are used to retrieve data from the database server 22. These web server computers do maintain various product images that are required for the specified time period. For example, all products to be auctioned which can now be browsed by a user. The small image used on the left-hand side on the "Next on the Block" screen as well as the more detailed image used in the right-hand portion of the screen shown in FIG. 9 are stored on the web server computers. In addition, various templates are maintained on each web server computer. With this arrangement, the various applications which are maintained on each web server computer merely has to obtain information from the database server, which information must pass through the firewall 20. The web server then merges this information with the appropriate product images and templates and presents the appropriate information to the user. This reduces the transaction time. It also provides a system which is highly reliable and secure. As can be appreciated, the web server does not maintain sensitive data and merely retrieves data from the database when requested by the user. This allows fast response to service requests and rapid expendability of the system. The images are large, non-sensitive records and improved speed is achieved by having the web server computers additionally maintain these product images.

Figure 3:
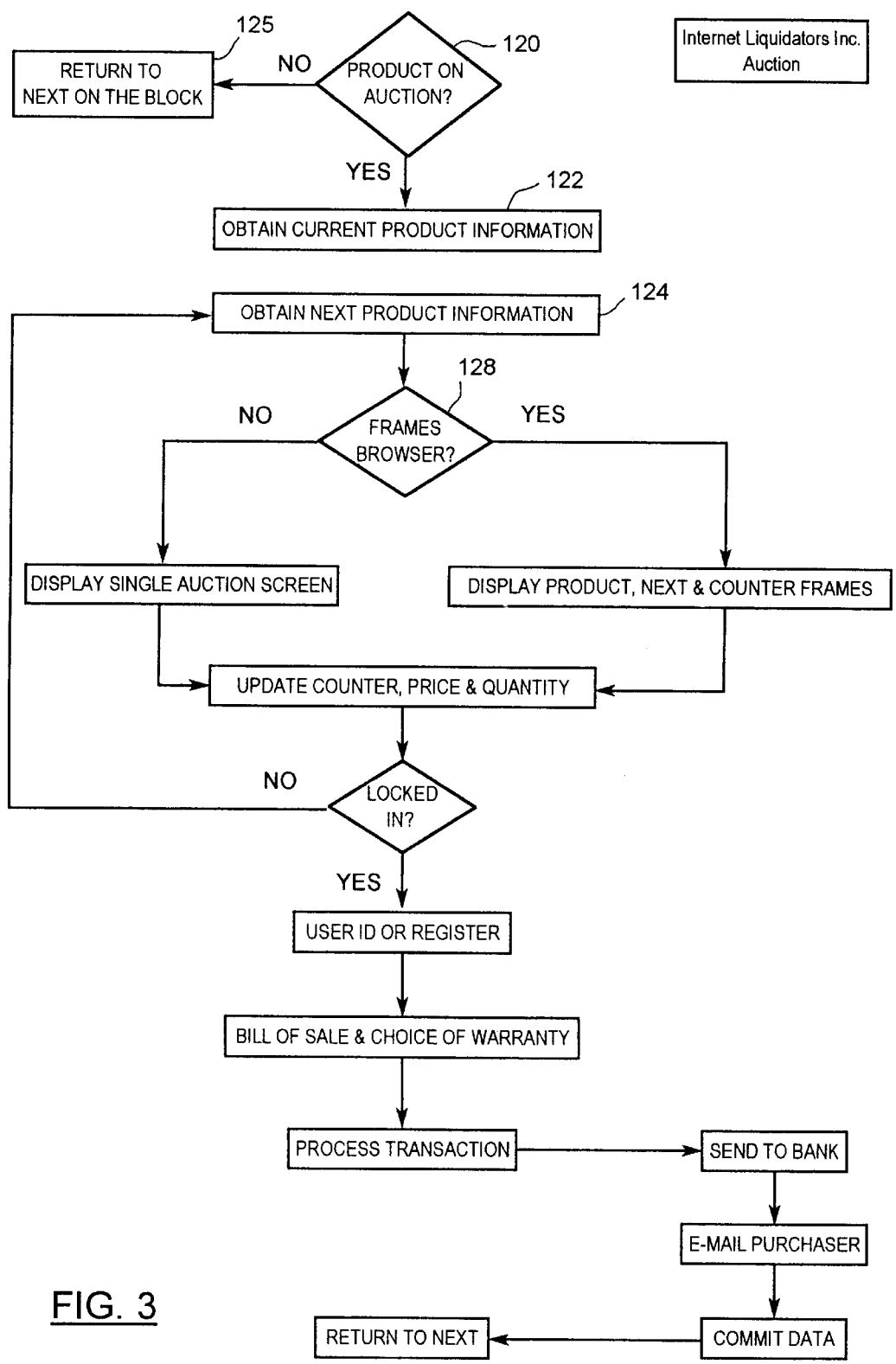
FIG. 3 is an overview showing logic regarding the auction process.
Figure 10:
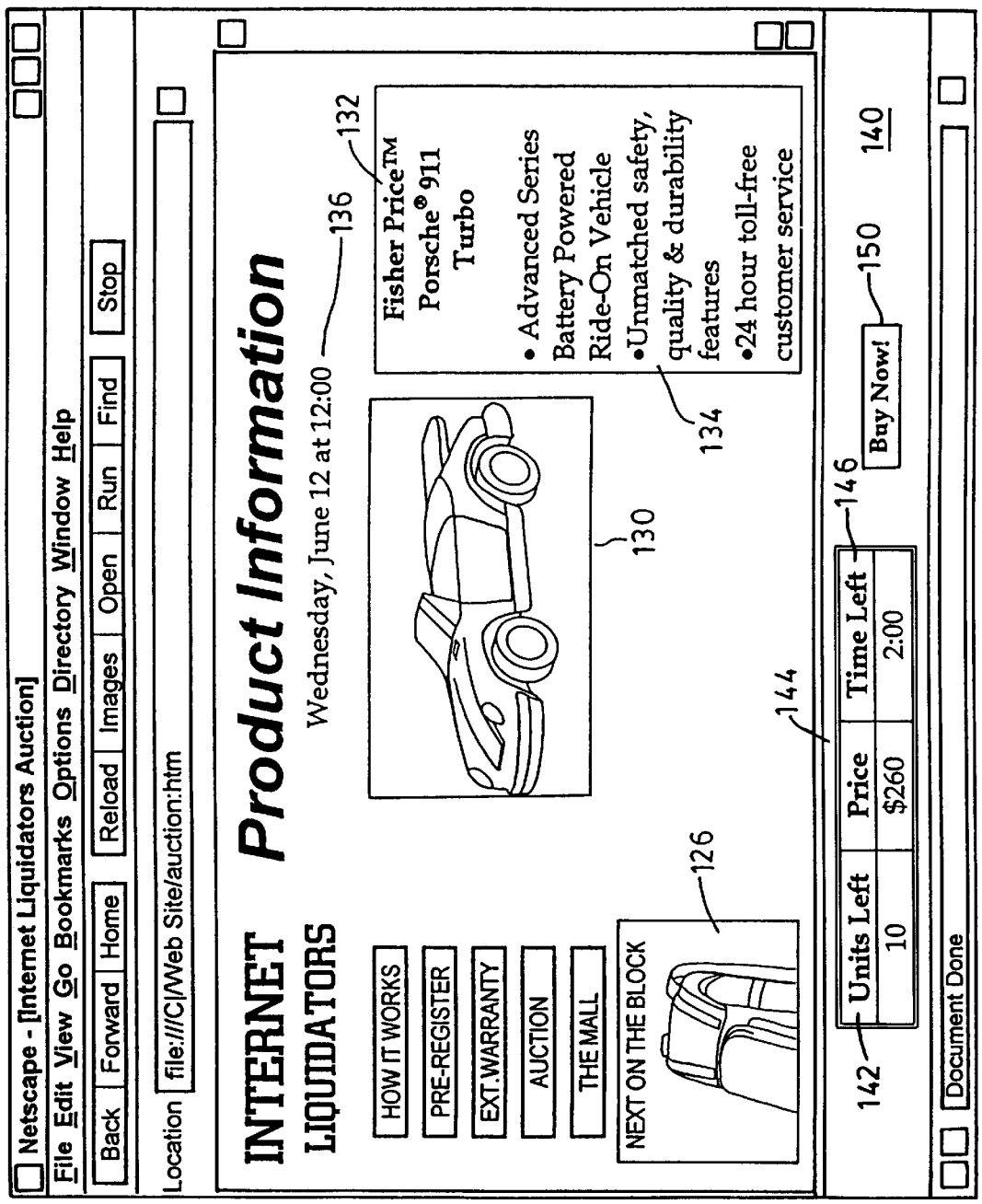

Details of the auction process are generally shown in FIG. 3. The screen for "Next on the Block" shown in FIG. 8 and in FIG. 7 allow the user to actuate trigger 88 and enter the auction process. This trigger takes the browser to the logic of FIG. 3. A decision is made at 120 whether in fact an auction is in progress. If an auction is in progress, the web server obtains current product information from the database server indicated at step 122. If there is no auction in process, they return to the "Next on the Block" screen indicated at step 124. This returns the user to the screen shown in FIG. 8. Once the web server has obtained the current product information indicated as 122 in FIG. 3, the screen shown in FIG. 10 is eventually produced. In order to produce the screen, the web server computer obtains next product information indicated at step 124 and this is displayed at 126 on the left-hand side of the screen of FIG. 10. A decision is also made at 128 whether the browser is frame based, or whether it is the standard HTML 2.0 type browser. Because of the wide difference in the two types of browsers, these are each dealt with separately. FIG. 10 is a frame based system and therefore produces the screen of FIG. 10. This screen includes a large product image 130, a brief product description shown as 132 and a detailed product description shown as 134. This portion of the screen is relatively constant during the auction process. In addition, there is the time and date at 136. On the left-hand side there are the various triggers and the product which is "Next on the Block". The auction process and the really dynamic variables of the auction process are shown at the bottom portion of the screen indicated as 140. The first column 142, shows the number of units remaining to be auctioned. In this case, there are ten units remaining to be auctioned. The price of the unit, at the current time, is shown at 144 and is $260.00. The last column 146 identifies the time remaining in the auction as being two minutes. There is also the trigger 150 indicating the desire to buy the product at the particular price.

The number of units left, the current price and the time left in the auction are frequently updated and in the last few minutes of the auction are updated at five second intervals. The number of units left are updated to clearly reflect the number of purchases indicated during the process. The price is decreasing as the time remaining in the auction decreases. The price decreases in a pre-determined manner. The database server provides the number of units left, the current price and the time left to the web server computer. With this arrangement, the user is exposed to the dynamics of the auction process and must gauge the value of buying the product at that particular price versus delaying his decision to purchase and hope that the price will decrease assuming that there will still be products left to purchase. The auction continues until the number of units left to be sold is zero, or the time left in the auction expires. By decreasing the price, the demand for the product increases. The auction process will assume that there will be a certain fall-out rate in the actual purchase confirmation and there can be some over-selling of the product. If a user decides to purchase, he merely clicks on the trigger 150 indicating his choice to buy the product at that particular price. Once this trigger is actuated, the user is removed from the auction process and he is asked to complete the screen shown in FIG. 11. If the user has pre-registered, he may merely enter his user I.D. and PIN number for security at 160. This is typically the first time the identity of the user is known. If he is not registered, he is forced to fill in the various fields shown below the user I.D. This purchase confirmation screen has a fixed time period to be completed and as stated, has a life span of two minutes. Confirmation that the user wishes to continue is indicated by pressing trigger 162 at the bottom of the screen, indicating that he wishes to proceed. Actuation of trigger 162 produces the screen shown in FIG. 12. Again, this screen has a life span of two minutes. Additional information has now been provided regarding the purchase of the product. The unit cost of the product, which was the current price when the user indicated that he wished to purchase it, is provided at 164. The freight cost has been determined based on the user's address, and is shown at 166. Various taxes are computed and displayed at 168 and 170 and the total price is shown at 172. The user then can either indicate that he wishes to proceed by actuating trigger 174 or if he wishes to cancel the process, indicated by trigger 176. If wishing to purchase, the user is then forced to provide credit card information indicated at lines 178 and 180. Once the user has indicated his desire to purchase the product, and has entered the information requested as shown in the screens in FIGS. 11 and 12, the data is stored in the database server in an encrypted form. The data being the user's name and address and E-mail address, as well as credit card information. This provides additional security to the user.

Figure 11:
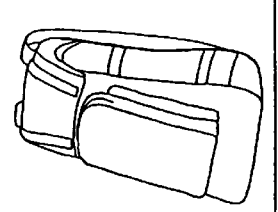

As suming the user wishes to confirm the purchase at the end of the screen shown in FIG. 11 the database server then takes the financial information and sends the pertinent information to the bank system for immediate authorization. Real time feedback is preferably provided directly to the user. If the transaction is turned down for any reason and the auction process remains in process, the quantity figure is appropriately adjusted higher. This quantity figure was decreased once the user indicated his desire to purchase.

If the transaction is authorized, then E-mail confirmation is sent by the mail server 34 to the user. If the transaction is not authorized, this can also be indicated to the user by E-mail. With the present system, it can be appreciated that although the user participates in the auction process, the actual commitment to purchase the product is not made until full costs are known, including the freight costs and appropriate taxes. If the user decides not to purchase the product, the product is returned to the auction if the auction is s till in progress. It can also be appreciated from the above description that the user is removed from the auction process as soon as a commitment to purchase is made. In this way, the final, or lowest price of the product is not known to the user.

The database server cooperates with each of the web server computers to allow for the rapid feed of information to the web server computers necessary to allow the user to be exposed to the dynamic nature of the auction. This dynamic feedback includes the results of multiple users with feedback occurring in seconds as opposed to minutes hours or days. It also allows the auction system to respond to a host of simultaneous triggers. Each web server is individually servicing many users. Many different auctions can be occurring at the same time and therefore each web server provides the appropriate feed back to each user.

The user's identity is also used to confirm that he was qualified to participate within the auction. Once the identity is known, non-qualified participants can be so advised and the indication to purchase cancelled.

Another feature of the auction system is the ability to track the price demand nature of the product. This provides valuable marketing information to the manufacturer. For example, in trying to determine the response at different prices, companies have to conduct various tests. In contrast with the auction system as shown a lot of information regarding price and demand is immediately known. The relationship between this type of purchasers and the average purchaser can then be applied to provide a conventional price demand curve for the particular product. It can readily be appreciated that the computer system provides the demand price curve.

In order to provide good feedback to users supporting the standard HTML 2.0 type browser, only a single auction screen is provided which has the number of units remaining, the current price and the time remaining in the auction. This type of browser is slower, but it does provide for relatively rapid feedback during the auction process.

The web server computers are application based and builds each page as requested by a user. Large volumes of requests can be not very quickly. Individual requests are serviced by the system within 70 milliseconds with loads up to about 90% capacity. At this point performance drops off and an additional web server is added which funs the same software to assume additional load.

The system for the auction process responds to actuation of the trigger 150 to update the sales and to remove the user from the auction process. The additional information is gathered in a less demanding environment. The actual dynamic variables of the auction is current price, quantity remaining and time remaining are refreshed at a fast rate (typically between 5 and 10 seconds).

The web server computers can be DEC ALPHA 400 computers and the database server can be a DEC ALPHA 1000.

The present system is designed to allow many users to participate in the auction process and rapidly process and provide feedback of sales as they are indicated many times within the last minutes of the auction. This requires the capability to rapidly process information and provide rapid updates to all users. With this arrangement the dynamic nature of a conventional reverse auction where users are all present at the same location is provided without all users being physically present in one location.

The system can provide this feedback over INTERNET making it available to hundreds of thousands of potential users.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of auctioning product on-line where computer terminals of potential purchasers are used to access a computer site comprising an auction server computer, said method comprising:

(a) assigning to each product a designated time for the product to be auctioned,
   (b) carrying out an auction at substantially the designated time by setting a fixed time period for completing the auction, displaying a current price for the product and decreasing the price of the product as the time remaining in the auction decreases, decreasing the quantity of product remaining to immediately reflect instructions from purchasers of their desire to purchase the product as the instructions are received during the auction,
   (c) providing each potential purchaser with a designated actuation control for instructing the computer site of the decision to purchase the product at the current price at the time of receiving the instructions, (d) removing a potential purchaser from the auction upon said purchaser operating the actuation control to purchase the product at the displayed current price at the time the instructions are received, and decreasing the quantity of product remaining to be auctioned, (e) continuing to decrease said price in step (d) and to display the price to each potential purchaser not removed in step (d);

(f) registering potential purchasers and obtaining and recording financial information for payment of purchased product, (g) increasing the remaining quantity if a preselected time limit for obtaining said financial data is exceeded, and (h) upon receipt of said financial information within the preselected time limit, initiating a transfer of funds to complete the sale of the product, and confirming the purchase of the product at the current price to the potential purchaser by sending a message confirming the purchase to the potential purchaser.

2. A method of auctioning product on-line as claimed in claim 1, wherein said step (f) can take place prior to operation of said actuation control in step (d).

3. A method of auctioning product on-line as claimed in claim 2, wherein said computer site is directly connected to separate and distinct financial institutions for real time confirmation of an acceptable financial transaction of the purchase price of a product.

4. A computer site for auctioning of product on-line comprising at least one web computer server designed for serving a host of computer browsers and provide said browsers with the capability to participate in various auctions where one of the auctions is of a single product at a specified time with a specified number of the product available for sale, said web server cooperating with separate database computers separated from said web server by a firewall, said database computer being accessible to said at least one web computer server to allow retrieval of product information which includes:

a) a product description, b) the quantity of the product to be auctioned, c) a start price of the product, and d) at least one product image, said web server computer including application software for auctioning any product identified in the database computer by:

(i) displaying to each browser during an auction the current price of the product, and a measure of the time remaining the auction, (ii) decreasing the current price during the auction, (iii) providing a user actuation control for indicating instructions to purchase the product at a displayed current price, (iv) continually updating, to each browser remaining in the auction, the current price, and the time remaining in the auction to provide dynamic feedback to each browser, (v) removing a browser from the auction upon receiving an instruction signal from the browser to purchase the product at the displayed current, price, decreasing the quantity of product remaining available for purchase, obtaining identification information and financial authorization for automated payment for the purchased product and effecting the payment, and (vi) upon receipt of said identification information and authorization, confirming the purchase of the product at the current price to the user by sending a message confirming the purchase to the user.

5. A process for auctioning products over an on-line computer network comprising an auction server and a plurality of computer terminals of potential purchasers, comprising the steps of:

for each lot of products to be sold, storing information relating to the auction start time, the initial price and the initial available quantity of product;

auctioning each lot of products by, for each lot:

(a) commencing an auction at substantially the stored auction start time with the stored quantity available, the stored initial price and a maximum time duration for said auction;

(b) transmitting from said server, to each of said plurality of computer terminals of potential purchasers the current price of said product and the time remaining in the auction;

(c) at selected time intervals, said server decreasing the price of said product by a selected amount to obtain a new current price;

(d) repeating steps (b) and (c) until the quantity of said product is exhausted or said maximum time duration of said auction is exceeded;

(e) simultaneously with any of steps (b) through (d), receiving from at least one of said plurality of computer terminals an indication that a potential purchaser wishes to purchase one of said product at said current price;

(f) removing said purchaser from said auction and decrementing said available quantity to reflect the sale of said one product to said purchaser and ceasing to perform steps (b) through (d) for said removed purchaser while continuing to perform steps (a) through (d) for each unremoved potential purchaser;

(g) prompting said removed purchaser for financial information to effect payment for said purchased product and imposing a time limit within which said information must be received from said removed purchaser and incrementing said available quantity to include said one product if said time limit is exceeded before said financial information is received;

(h) upon receipt of said financial information within said time limit, effecting said payment and confirming the purchase of said product at said current price to said potential purchaser by sending a message confirming said purchase to said at least one computer terminal.

6. A method of auctioning product on-line where computer terminals of potential purchasers are used to access a computer site comprising an auction server computer, said method comprising the steps of:

(a) carrying out an auction by displaying a current price for the product and decreasing the price of the product as the time remaining in the auction decreases, and decreasing the quantity of product remaining to be auctioned to immediately reflect instructions from purchasers of their desire to purchase the product as the instructions are received during the auction, (b) providing each potential purchaser with a designated actuation control for instructing the computer site of the decision to purchase the product at the current price at the time of receiving the instructions, (c) removing a potential purchaser from the auction upon said purchaser operating the actuation control to purchase the product at the displayed current price at the time the instructions are received, and decreasing the quantity of product remaining to be auctioned, (d) continuing to display the current price to each potential purchaser not removed in step (c);

(e) obtaining and recording financial information from potential purchasers for payment of purchased product; and (f) after receipt of said financial information, effecting payment to complete the sale of the product.

7. A method of auctioning product on-line as claimed in claim 6, wherein said step (e) can take place prior to operation of said actuation control in step (c).

8. A method of auctioning product on-line as claimed in claim 7, wherein said computer site is directly connected to separate and distinct financial institutions for real time confirmation of an acceptable financial transaction of the purchase price of a product.

9. A method of auctioning product on-line as claimed in claim 6, further comprising the step of, upon receipt of said financial information within a preselected time limit, confirming the purchase of the product at the current price to the potential purchaser by sending a message confirming the purchase to the potential purchaser.

10. A method of auctioning product on-line as claimed in claim 9, further comprising the step of, upon receipt of said financial information within the preselected time limit, initiating a transfer of funds to complete the sale of the product.

11. A method of auctioning product on-line as claimed in claim 6, further comprising the step of assigning to each product a designated time for the product to be auctioned and setting a fixed time period for completing the auction.

12. A method of auctioning product on-line as claimed in claim 6, wherein step (a) further comprises the step of displaying the quantity of product remaining to be auctioned as the instructions from purchasers of their desire to purchase the product are received to provide dynamic feedback to potential purchasers during the auction.

13. A method of auctioning product on-line as claimed in claim 12, step (d) further comprising the step of continuing to display the quantity of product remaining to be auctioned.

14. A method of auctioning product on-line as claimed in claim 6, further comprising the step of registering potential purchasers.

15. A method of auctioning product on-line as claimed in claim 14, wherein the step of registering potential purchasers is done prior to the auction.

16. A method of auctioning product on-line as claimed in claim 14, wherein the step of registering potential purchasers is done after removing a potential purchaser from the auction upon said purchaser operating the actuation control to purchase the product.

17. A method of auctioning product on-line as claimed in claim 16, further comprising the step of increasing the remaining quantity if a preselected time limit for obtaining said financial information is exceeded.

18. A method of auctioning product on-line as claimed in claim 17, further comprising the step of, upon receipt of said financial information within the preselected time limit, confirming the purchase of the product at the current price to the potential purchaser by sending a message confirming the purchase to the potential purchaser.

19. A method of auctioning product on-line as claimed in claim 18, further comprising the step of, upon receipt of said financial information within the preselected time limit, initiating a transfer of funds to complete the sale of the product.

20. A computer site for auctioning of product on-line comprising at least one web computer server designed for serving a host of computer browsers and provide said browsers with the capability to participate in various auctions by:

(i) displaying to each browser during an auction the current price of the product, (ii) decreasing the current price during the auction, (iii) providing a user actuation control for indicating instructions to purchase the product at a displayed current price, (iv) continually updating, to each browser remaining in the auction, the current price, and (v) removing a browser from the auction upon receiving an instruction signal from the browser to purchase the product at the displayed current price, decreasing the quantity of product remaining available for purchase, obtaining identification information and financial authorization for automated payment for the purchased product and effecting the payment.

21. A computer site for auctioning of product on-line as claimed in claim 20, wherein the auction is of a single product at a specified time with a specified number of the product available for sale, said web server cooperating with a separate database computer separated from said web server by a firewall, said database computer being accessible to said at least one web computer server to allow retrieval of product information which includes:

a) a product description, b) the quality of the product to be auctioned, c) a start price of the product, and d) at least one product image, said web server computer including application software for auctioning any product identified in the database computer.

22. A computer site for auctioning of product on-line as claimed in claim 20, wherein step (i) further comprises displaying to each browser during an auction the quantity of product remaining available for purchase, and a measure of the time remaining in the auction.

23. A computer site for auctioning of product on-line as claimed in claim 22, wherein step (iv) further comprises continually updating, to each browser remaining in the auction, the quantity of the product remaining available for purchase taking into account the product indicated as purchased, and the time remaining in the auction to provide dynamic feedback to each browser.

24. A computer site for auctioning of product on-line as claimed in claim 23, wherein step (v) further comprises increasing the remaining quantity if a time limit for obtaining the identification information or authorization is exceeded.

25. A computer site for auctioning of product on-line as claimed in claim 24, further comprising the step of, upon receipt of said identification information and authorization, confirming the purchase of the product at the current price to the user by sending a message confirming the purchase to the user.

26. A method of conducting an auction where computer terminals of potential purchasers are used to access a computer site, each potential purchaser being equipped with actuation means for submitting to the computer site an offer to purchase a product, each auction comprising a finite number of said product available, the method comprising the steps of:

periodically reducing the price of the product;

receiving from a potential purchaser an offer during the auction;

accepting the offer during the auction;

removing the potential purchaser from the auction upon receipt of the offer;

reducing the finite number of products available during the auction;

checking for verification of payment during the auction;

if verification is not received, then increasing the finite number of products available; and effecting payment for purchase of the product.

27. The method of claim 26, further including the step of assigning a current price to the product and displaying the current price to each potential purchaser.

28. The method of claim 27, further comprising the step of adding the purchaser back to the auction if verification is not received.

\* \* \* \* \*